United States Patent
Margulis et al.

(10) Patent No.: US 12,487,282 B2
(45) Date of Patent: Dec. 2, 2025

(54) ON-CHIP DISTRIBUTION OF TEST DATA FOR MULTIPLE DIES

(71) Applicants: Advanced Micro Devices Products (China) Co. Ltd., Beijing (CN); ATI TECHNOLOGIES ULC, Markham (CA)

(72) Inventors: Arie Margulis, Markham (CA); Tassanee Payakapan, Markham (CA); Yuan Chao, Beijing (CN)

(73) Assignees: Advanced Micro Devices Products (China) Co., Ltd., Beijing (CN); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/564,129

(22) Filed: Dec. 28, 2021

(65) Prior Publication Data

US 2023/0204662 A1    Jun. 29, 2023

(51) Int. Cl.
*G01R 31/3177* (2006.01)
*G01R 31/317* (2006.01)

(52) U.S. Cl.
CPC ... *G01R 31/3177* (2013.01); *G01R 31/31713* (2013.01); *G01R 31/31723* (2013.01)

(58) Field of Classification Search
None
See application file for complete search history.

(56) References Cited

U.S. PATENT DOCUMENTS

| | | | |
|---|---|---|---|
| 5,841,670 A | 11/1998 | Swoboda | |
| 6,646,461 B2* | 11/2003 | Sugiura | G01R 31/3187 324/754.03 |
| 7,449,350 B2* | 11/2008 | Pourkeramati | G01R 31/2884 438/17 |
| 8,151,151 B2* | 4/2012 | Warren | G01R 31/318536 714/724 |
| 9,404,969 B1* | 8/2016 | Keller | G06F 11/277 |
| 10,955,472 B1* | 3/2021 | Trock | G01R 31/31721 |

(Continued)

FOREIGN PATENT DOCUMENTS

| | | |
|---|---|---|
| CN | 1819197 | 8/2006 |
| CN | 113419164 | 9/2021 |

(Continued)

OTHER PUBLICATIONS

International Search Report and Written Opinion issued in Application No. PCT/IB2022/062741, mailed Mar. 13, 2023, 10 pages.

(Continued)

*Primary Examiner* — Guerrier Merant (57) ABSTRACT

A multi-die integrated circuit uses an on-chip test distribution module to distribute test data to different dies, such as processor chiplets. The test distribution module receives test input data from an external source via one or more integrated circuit pins and distributes the test input data to the different dies, such that the different dies are able to concurrently apply the test data to one or more circuits. Based on application of the test input data the different dies concurrently generate corresponding test results that are used to identify and address design or operation errors at the dies.

20 Claims, 5 Drawing Sheets

(56) References Cited

U.S. PATENT DOCUMENTS

| | | | | |
|---|---|---|---|---|
| 2001/0047496 | A1* | 11/2001 | Hidaka | G11C 29/48 |
| | | | | 714/5.1 |
| 2002/0031025 | A1* | 3/2002 | Shimano | G11C 29/44 |
| | | | | 365/201 |
| 2003/0151422 | A1* | 8/2003 | Barnett | G06F 17/18 |
| | | | | 324/750.05 |
| 2004/0006729 | A1* | 1/2004 | Pendurkar | G11C 29/32 |
| | | | | 714/733 |
| 2004/0187049 | A1 | 9/2004 | West | |
| 2007/0176621 | A1* | 8/2007 | Tanamachi | G01R 31/31718 |
| | | | | 324/762.05 |
| 2008/0201624 | A1 | 8/2008 | Kim et al. | |
| 2008/0206903 | A1* | 8/2008 | Chan | G01R 31/31707 |
| | | | | 702/118 |
| 2009/0259889 | A1* | 10/2009 | Luo | G01R 31/318586 |
| | | | | 714/E11.17 |
| 2013/0127441 | A1* | 5/2013 | Tseng | G01R 31/31924 |
| | | | | 324/76.11 |
| 2016/0306010 | A1 | 10/2016 | Li | |
| 2016/0349320 | A1* | 12/2016 | Laisne | G01R 31/31724 |
| 2016/0377677 | A1* | 12/2016 | Tille | G06F 11/267 |
| | | | | 714/727 |
| 2017/0162276 | A1* | 6/2017 | Ok | G11C 29/36 |
| 2018/0211946 | A1* | 7/2018 | Shiu | H01L 21/78 |
| 2022/0260632 | A1* | 8/2022 | Rathert | G01R 31/2856 |

FOREIGN PATENT DOCUMENTS

| | | | | |
|---|---|---|---|---|
| JP | H05240911 A | * | 9/1993 | |
| WO | WO-2004005949 A1 | * | 1/2004 | G01R 31/318558 |
| WO | WO-2010035238 A1 | * | 4/2010 | G01R 31/3185 |
| WO | WO-2021028723 A2 | * | 2/2021 | G06F 12/0646 |
| WO | WO-2022096564 A1 | * | 5/2022 | B01D 61/18 |

OTHER PUBLICATIONS

International Preliminary Report on Patentability issued in Application No. PCT/IB2022/062741, mailed Jul. 11, 2024, 7 pages.

Giles, Grady et al., "Test Access Mechanism for Multiple Identical Cores", 2008 IEEE International Test Conference, Oct. 2008, 10 pages.

Vivet, Pascal et al., "3D Design-For-Test Solution For Chiplet-Based Active Interposer Architecture", 3D Chiplet Test Workshop, Nov. 2020, 24 pages.

* cited by examiner

ON-CHIP DISTRIBUTION OF TEST DATA
FOR MULTIPLE DIES

BACKGROUND

To enhance processing performance and efficiency, some processors are implemented as integrated circuits having multiple functional dies, with each functional die including circuitry to implement a set of corresponding functions, such as processing functions, memory functions, and the like. For example, some processors employ a chiplet-based design, wherein each of a plurality of processor dies implements a corresponding processor chiplet, with each chiplet designed and configured to execute at least a subset of designated processor operations, such as central processing unit (CPU) operations, graphics processing unit (GPU operations), and the like. The chiplets and other processor dies (e.g., memory dies) are arranged in a 3-dimensional stack and the stack is placed in an integrated circuit package, with the package including multiple pins to allow access to different signal paths of the dies. Because the multiple functional dies in the same integrated circuit package, the dies can communicate and coordinate processing operations efficiently, and by consuming relatively little power. However, performing tests, such as tests to confirm proper operation of the individual functional dies, is typically inefficient and expensive.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for distributing test data to different dies, such as processor chiplets, of a multi-die integrated circuit, using an on-chip test distribution module. The test distribution module receives test input data from an external source via one or more integrated circuit pins and distributes the test input data to the different dies, such that the different dies can concurrently apply the test data to one or more circuits. Based on application of the test input data the different dies concurrently generate corresponding test results that are used to identify and address design or operation errors at the dies. Because the test input data is distributed via an on-chip module, the test data can be provided to the integrated circuit relatively efficiently, without requiring a large number of dedicated test pins, thus simplifying the integrated circuit design while also conserving test and development time and resources.

To illustrate, for a conventional single-die integrated circuit, such as conventional processor, test data is applied to the integrated circuit in one of two ways: serially, via a relatively small number of dedicated test pins, or in parallel, via a larger number of dedicated test pins. For multi-die integrated circuits, it is desirable to test each of the individual dies, so that errors can be located and addressed in any individual die. However, dedicating test pins to each individual die for parallel application of test data demands a large number of dedicated pins, increasing the overall size of the integrated circuit or requiring the repurposing of pins that might otherwise be used for non-test operations. Further, applying test data serially to a multi-die integrated circuit requires a relatively large amount of time, as the same test data is repeatedly applied to the input pins for different individual dies. In contrast, using the techniques described herein, a multi-die integrated circuit can be tested with a relatively small number of dedicated test pins, but without demanding a large amount of test time and other resources.

FIGS. 1-6 are described with respect to an example integrated circuit including multiple dies that form a processor, in accordance with some embodiments. However, it will be appreciated that in other embodiments the techniques described herein are implemented in other types of integrated circuits. For example, in some embodiments, the techniques described herein are implemented in an integrated circuit that includes memory, such as a memory module having multiple integrated circuit dies. Furthermore, as used in this disclosure, the terms "die", and "chip" are interchangeably used. Similarly, the terms "integrated circuit die" and "semiconductor die" are interchangeably used.

Figure 1:
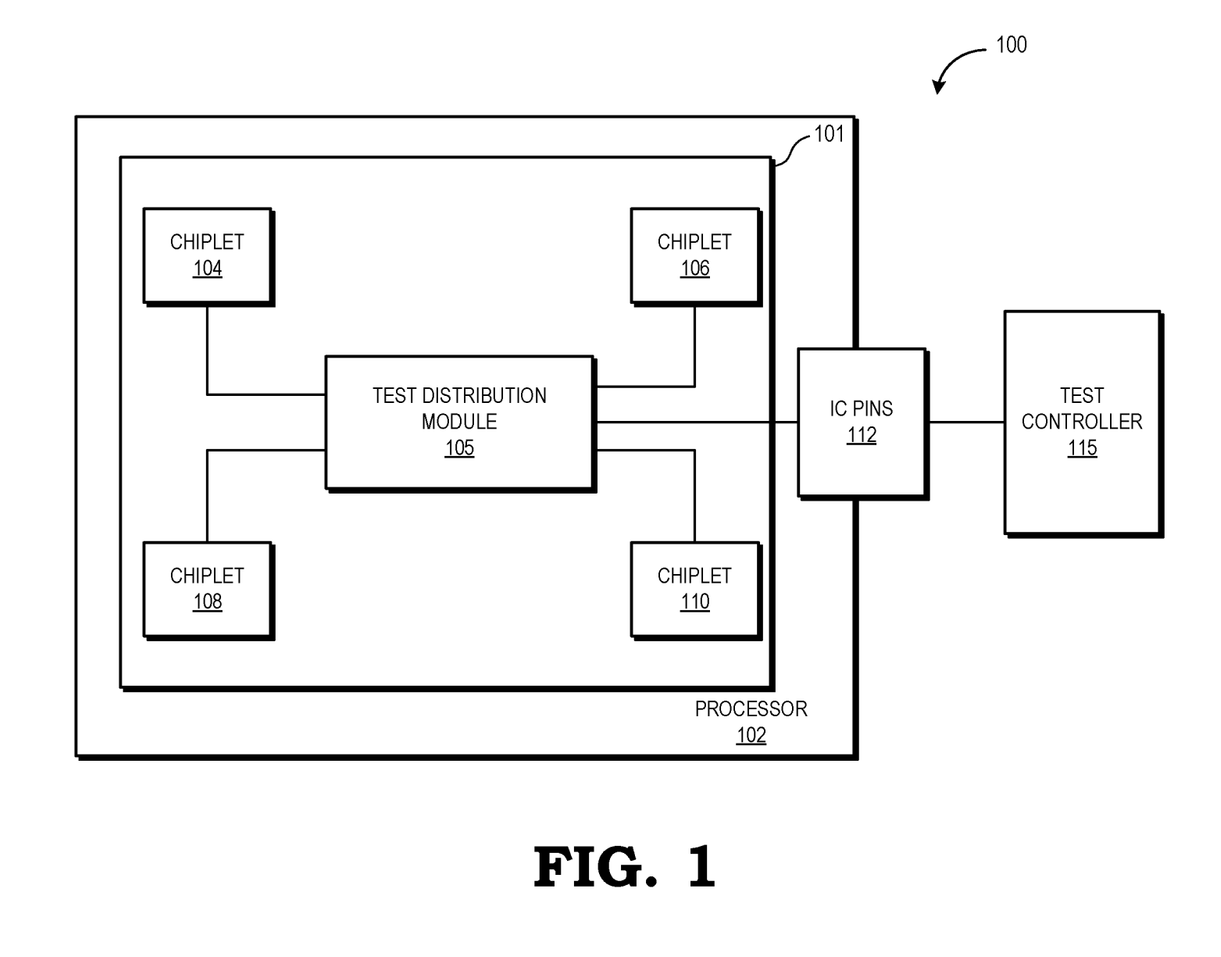
FIG. 1 is a block diagram of a processor testing system, wherein the processor under test includes on-chip distribution of test data for multiple dies in accordance with some embodiments.

FIG. 1 illustrates a block diagram of a processor 102 including a test distribution module 105 that is generally configured to distribute test data received from an external test controller 115 and distribute the received test data to different semiconductor dies. The processor 102 is generally configured to execute sets of instructions to carry out specified tasks on behalf of an electronic device. Accordingly, in different embodiments, the processor 102 is incorporated into one of a number of different types of electronic device, including a desktop computer, laptop computer, server, smartphone, tablet, game console, and the like.

The processor 102 is constructed as a multi-chip module (e.g., a semiconductor die package) including two or more base integrated circuit dies communicably coupled together with bridge chip(s) such that the processor 102 is usable (e.g., addressable) like a single semiconductor integrated circuit. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as silicon interposers, non-semiconductor packaging substrates including printed circuit boards, non-silicon, interposers, and possibly others) are assembled in a multi-die processor.

In various embodiments, the processor 102 includes one or more base IC dies (e.g., base die 101) employing processing stacked die chiplets in accordance with some embodiments. The base dies are formed as a single semiconductor chip package including N number of communicably coupled stacked die chiplets. For example, in the illustrated embodiment, the processor 102 includes four chiplets, designated chiplets 104, 106, 108, and 110. It should be recognized that although various embodiments are described below in the particular context of CPU chiplets and GPU chiplets for ease of illustration and description, the concepts described here is also similarly applicable to other processors including accelerated processing units (APUs), discrete GPUs (dGPUs), artificial intelligence (AI) accelerators, other parallel processors, and the like. For example, in some embodiments, the processor 102 includes a plurality of dies connected via a silicon communication bridge, an embedded multi-die interconnect (EMIB), an embedded fanout bridge (EFB), and the like.

In various embodiments, and as used herein, the term "chiplet" refers to any device including, but is not limited to, the following characteristics: 1) a chiplet includes an active silicon die containing at least a portion of the computational logic used to solve a full problem (i.e., the computational workload is distributed across multiples of these active silicon dies); 2) chiplets are packaged together as a monolithic unit on the same substrate; and 3) the programming model used to control a particular set of chiplets preserves the concept that the combination of these separate computational dies (e.g., the set of graphics processing stacked die chiplet) as a single monolithic unit. That is, each chiplet of a particular set is not exposed as a separate device to an application that uses the set of chiplets for processing computational workloads, but instead are exposed to the application so that the set of chiplets collectively appears as a unified processing unit, such as a graphics processing unit (GPU) or central processing unit (CPU). For example, an AMD Ryzen Threadripper includes multiple CPU chiplets. Moreover, in some embodiments the processor 102 includes multiple sets of chiplets that together are exposed as different processing units to an application. For example, in some embodiments the chiplets 104 and 110 form a set of CPU chiplets that together appear as a single CPU to an application, and the chiplets 106 and 108 form a set of GPU chiplets that together appear as a single GPU to the application. As will be appreciated by those of ordinary skill, while CPU chiplets and GPU chiplets are first and second die types, chiplets comprising other die types can also be included in various embodiments. For example, a chiplet including one or more: digital signal processors (DSPs); field programmable gate arrays (FPGAs), neural processing units (NPUs); and others, could also be employed.

In various embodiments, the processor 102 includes an inter-chip data fabric (not shown) that operates as a high-bandwidth die-to-die interconnect between chiplets. Additionally, in various embodiments, each of the chiplets 104, 106, 108, and 110 includes one or more levels of cache memory and one or more memory PHYs (not shown) for communicating with external system memory modules, such as dynamic random-access memory (DRAM) modules.

The test distribution module (TDM) 105 is a set of circuits that are generally and collectively configured to receive test data from an external test controller 115, via a set of integrated circuit (IC) pins 112. In different embodiments, the IC pins 112 are any type of interconnection or terminal that allows electrical signals to be communicated from an external device, such as the test controller 115, to an internal module of the integrated circuit formed by the processor 102.

In some embodiments, the test controller 115 is a computer device generally configured to generate test input data and corresponding expected test results. For example, in some embodiment the test controller 115 simulates operation of the chiplets 104, 106, 108, and 110, to determine, based on a particular string of input data, the corresponding output data that is generated by a chiplet when the chiplet is operating properly. The test controller 115 employs the simulations to generate the test input data and the corresponding expected test results. Further, in some embodiments, the test input data generated by the test controller 115 includes multiple test input data strings, each corresponding to a different expected test result, and each input data string configured to test a different portion or operation of one or more of the chiplets 104, 106, 108, and 110.

In some embodiments, the TDM 105 is configured to receive the test input data from the test controller 115, via the IC pins 112. In response, the TDM distributes copies of the test input data to each of the chiplets 104, 106, 108, and 110 (the chiplets 104-110). In response to the test data, each of the chiplets 104-110 generates corresponding test output results for comparison to the expected test results. Thus, in at least some embodiments, the data provided at the IC pins 112 is distributed to multiple ones of the chiplets 104-110. In other words, the test input data provided at one of the IC pins 112 is copied and provided to multiple ones of the chiplets 104-110. The test controller 115 is able to supply test data to each of the chiplets 104-110 using a relatively small set of IC pins 112 and in particular without requiring a different set of dedicated test pins for each of the chiplets 104-110.

For example, in some embodiments, the TDM 105 applies the copies of the test input data to corresponding input terminals of each of the chiplets 104-110. One or more clocks signals (not shown) are applied to the chiplets 105-110, either by the test controller 115, by the TDM 105, or a combination thereof, resulting in the chiplets 104-110 executing one or more operations based on the test input data. This causes the chiplets 104-110 to generate, after a specified number of clock signals, test output data at a corresponding set of output terminals. In some embodiments, the TDM 105 receives the test output data from the chiplets 104-110 and provides the test output data, via the IC pins 112, to the test controller 115. In response, the test controller 115 compares the test output data for each of the chiplets 104-110 to the expected test results, and identifies any errors based on the comparison.

In other embodiments, the test controller 115 provides the expected test results to the TDM 105 with the test input data. In response to receiving test output results from the chiplets 104-110, the TDM 105 compares the test output results with the expected test results. Based on the comparison, the TDM 105 provides signaling to the test controller 115 (e.g., via the IC pins 112) indicating any matches or mismatches. For example, in response to identifying a mismatch between the test output data generated by the chiplet 106 and the expected test results and identifying matches between the test output data generated by the chiplets 104, 108, and 110 and the expected test results, the TDM 105 provides signaling to the test controller 115 indicating an error at the chiplet 106, and indicating a satisfactory result at chiplets 104, 108, and 110.

In some embodiments, the test controller 115 provides one or more test masks to the TDM 105 and provides control information indicating which of the one or more masks is to be applied to test output data. Based on the control information, the TDM 105 selects one of the provided masks and applies the mask to received test output data, thereby generating masked test output data. In some embodiments, the TDM 105 then provides the masked test input data to the test controller 115 via the IC pins 112. In other embodiments, the TDM 105 uses the masked test data to compare to the expected test results and based on the comparison indicates any errors to the test controller 115 via the IC pins 112.

In some embodiments, the test controller 115 provides control information to the TDM 105 to select a subset (e.g., fewer than all) of the chiplets 104-110 for application of test input data. Based on the control information, the test controller 115 selects the indicated subset of the chiplets 104-110 and provides the test input data only to those chiplets in the selected subset. This allows, for example, the test controller 115 to test only particular ones of the chiplets 104-110, such as only those chiplets having the same chiplet type (e.g., only GPU chiplets or only CPU chiplets). This also enables TDM 105 and test controller 115 to test a processor that includes chiplets of one type (e.g., CPU chiplets) and also chiplets of a second type (e.g., GPU). In some embodiments, the chiplets 104-110 communicate with the TDM 105 via an interposer, such as a silicon interposer, a silicon bridge, or a silicon substrate, and the like, or any combination thereof.

Figure 2:
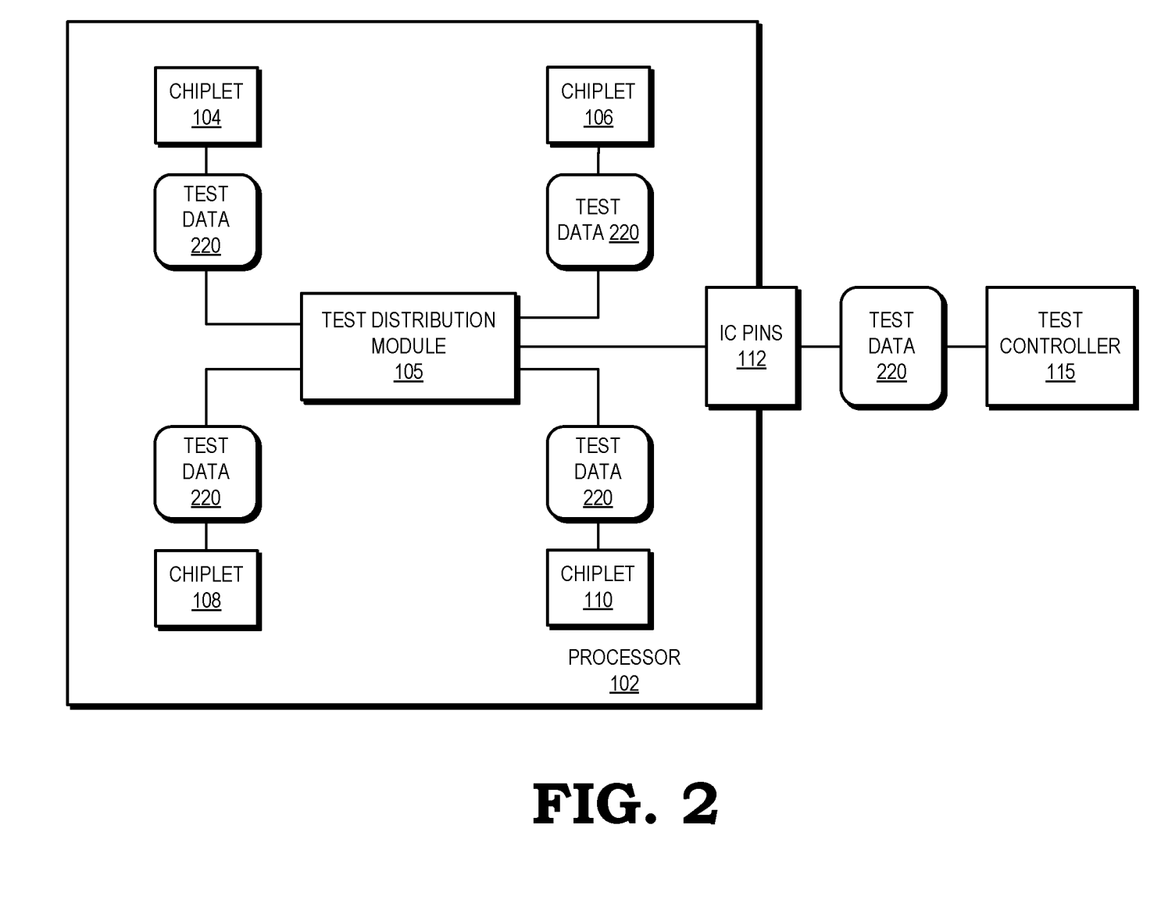
FIG. 2 is a block diagram illustrating an example of the processor of FIG. 1 distributing test data to different processor chiplets in accordance with some embodiments.

FIG. 2 illustrates an example of the TDM 105 distributing test data to the chiplets 104-110 in accordance with some embodiments. In the depicted example, the test controller 115 provides test input data 220 to the TDM 105 via the input pins 112. In response, the TDM 105 provides the test input data 220 to each of the chiplets 104, 106, 108, and 110. In at least some embodiments, the TDM 105 provides the test data 220 to each of the chiplets 104-106 concurrently. This in turn causes the chiplets 104-106 to generate the corresponding test output data concurrently, resulting in shorter testing times for the processor 102.

Figure 3:
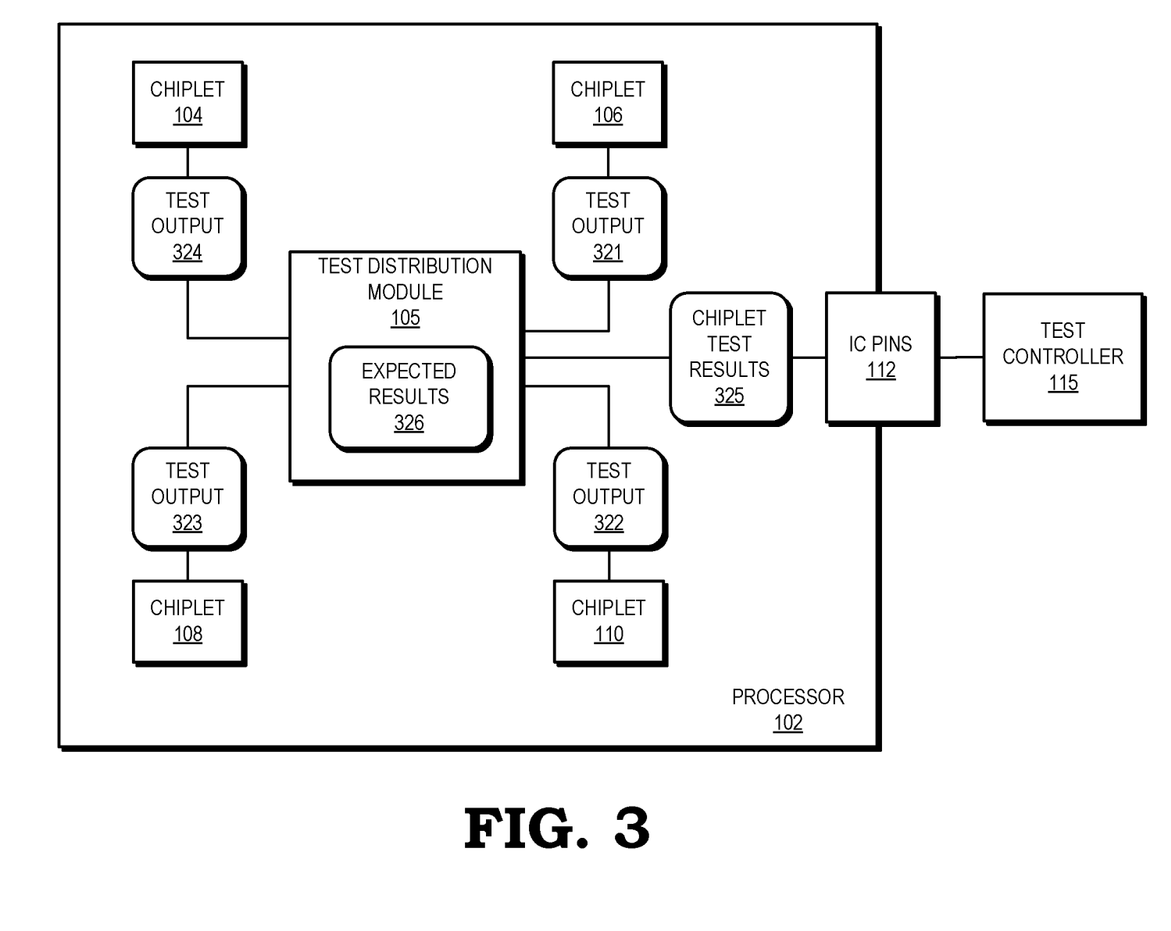
FIG. 3 is a block diagram illustrating an example of the chiplets of FIG. 2 providing test output data for comparison to expected test results in accordance with some embodiments.

FIG. 3 illustrates an example of the providing chiplets 104-110 providing test output data to the TDM 105 in accordance with some embodiments. In the depicted example, the chiplets 104-110 have each generated test output data based on the test input data 220 (FIG. 2). In particular, chiplet 104 generates test output data 324, chiplet 106 generates test output data 321, chiplet 108 generates test output data 323, and chiplet 110 generates test output data 322.

In the depicted example, the TDM 105 stores a set of expected test results 326. In at least some embodiments, the expected test results are provided to the TDM 105 by the test controller 115 via the IC pins 112. In response to the chiplets 104-110 generating test output data, the TDM 105 compares each test output data to the expected test results 326. That is, the TDM 105 compares each of the test output data 321, 322, 323, and 324 to the expected test results 326. Based on the comparison, the TDM 105 generates chiplet test results 325. In at least some embodiments, the chiplet test results 325 indicate which of the test output data 321, 322, 323, and 324 matches the expected test results 326. Thus, for example, in some embodiments the chiplet test results 325 includes a four-bit field, with each bit corresponding to a different one of the chiplets 104-110, and with the state of each bit indicating whether the corresponding test output data matches the expected test results 326. The TDM 105 provides the chiplet test results 325 to the test controller 115 via the IC pins 112, and in response the test controller 115 employs the chiplet test results 325 to identify any errors at the chiplets 104-110.

Figure 4:
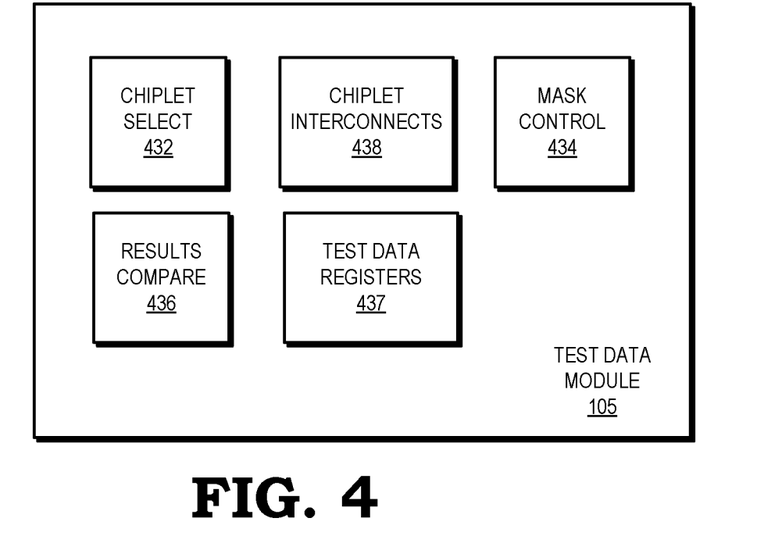
FIG. 4 is a block diagram illustrating an example of test distribution module of the processor of FIG. 1 in accordance with some embodiments.

FIG. 4 illustrates a block diagram of the TDM 105 in accordance with some embodiments. In the depicted example, the TDM 105 includes a chiplet select module 432, a mask control module 436, a set of test data registers 437, and a set of chiplet interconnects 438. The test data registers 437 are a set of registers configured to store the test input data for distribution to the chiplets 104-110, and to store the resulting test output data. Thus, in some embodiments, the test data registers 437 store the test input data 220 (FIG. 2) and store the corresponding test output data 321, 322, 323, and 324 (FIG. 3). In some embodiments, the test data registers 437 also store any control information provided by the test controller 115, and further store any masks provided by the test controller 115 for application to the test output data.

The chiplet interconnects 438 are a set of interconnects between the TDM 105 and the chiplets 104-110. The interconnects 438 thus allow the TDM to provide the stored test input data to one or more of the chiplets 104-110, and to receive the resulting test output data from the chiplets 104-110. In some embodiments, the chiplet interconnects 438 are a set of dedicated electrical connections between the TDM 105 and the chiplets 104-110. In other embodiments, the interconnects 438 are a switching fabric or other controllable interconnect between the TDM 105 and the chiplets 104-110, wherein the TDM 105 controls the chiplet interconnects 438 to establish, or discontinue, individual connections to the chiplets 104-110.

The chiplet select module 432 is a module that controls which of the chiplets 104-110 are to receive test input data. For example, in some embodiments the test controller 115 provides, with the test input data, control information indicating a selected subset of the chiplets 104-110 that are to receive the test input data. Based on the test input data, the chip select module 432 controls the chiplet interconnects 438 so that only the selected subset of the chiplets 104-110 is provided the test input data.

The mask control module 434 is a module that applies masks to the test output data at the test data registers 437. For example, in some embodiments the test controller 115 provides one or more masks with the test input data. The mask control module 434 identifies the provided masks and applies the provided masks to the test output data at the test data registers 437. The TDM 105 thereby provides the test controller 115 with finer control over the particular test output data used for comparison to the expected test results. For example, by applying masks to the test output data, the TDM 105 can test particular portions of the chiplets 104-110. In some embodiments, the masks are employed to mask all the test output data from specified ones of the chiplets 104-110, so that only a selected subset of the chiplets 104-110 are tested.

The results compare module 436 is a module that compares the test output data generated by the chiplets 104-110 to the expected test results 326. For example, in some embodiments the results compare module 426 includes a set of comparators, with each comparator configured to compare a bit of the test output data for one of the chiplets 104-110 to a corresponding bit of the expected test results 326. Thus, the results compare module generates a comparison for each bit of the generated test output data with a corresponding bit of the expected test results 326. In some embodiments, the results compare module 436 logically combines the results of the comparisons (e.g., by performing an OR operation using the results of the comparisons for a given set of test output data) to generate a single comparison value for each of the chiplets 104-110. The results compare module 436 collates the results of the logical combinations to generate the chiplet test results 325 for provision to the test controller 115.

Figure 5:
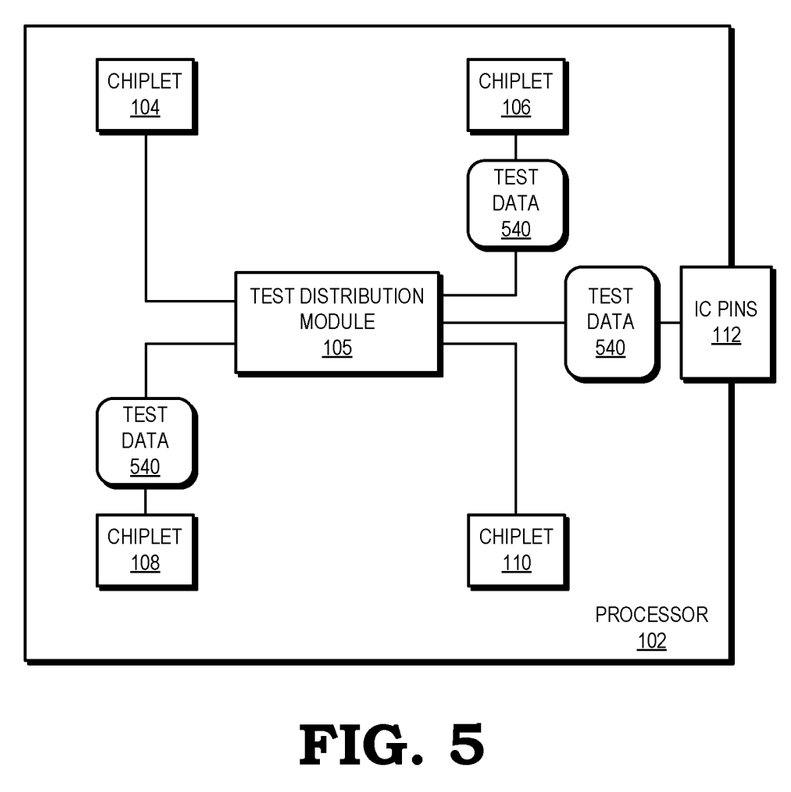
FIG. 5 is a block diagram illustrating an example of the processor of FIG. 1 selectively distributing test data to different processor chiplets, based on chiplet type, in accordance with some embodiments.

As noted above, in some cases the TDM 105 provides test input data to only a selected subset of the chiplets 104-110. An example is illustrated at FIG. 5 in accordance with some embodiments. In the depicted example, the TDM 105 receives test input data 540 via the IC pins 112. In addition, it is assumed that the test controller 115 provides control data (not shown) to the TDM 105 indicating which of the chiplets 104-110 is to receive the test data 540. Accordingly, in the example of FIG. 5, based on the control information the TDM provides the test data 540 to only the chiplets 106 and 108, and does not provide the test data 540 to the chiplets 104 and 110. The TDM 105 thus supports selective testing of the different chiplets 104-110. For example, in some embodiments the chiplets 104 and 110 are chiplets of a particular type, such as CPU chiplets, and the chiplets 106 and 108 are chiplets of a different type, such as GPU chiplets. Accordingly, the chiplets 104 and 110 have different circuitry than the chiplets 106 and 108 and are tested by different test input data. By allowing the test controller 115 to select subsets of the chiplets 104-110 to be independently tested, the TDM 105 supports flexible testing of the different chiplets, without requiring a large number of dedicated test pins.

Figure 6:
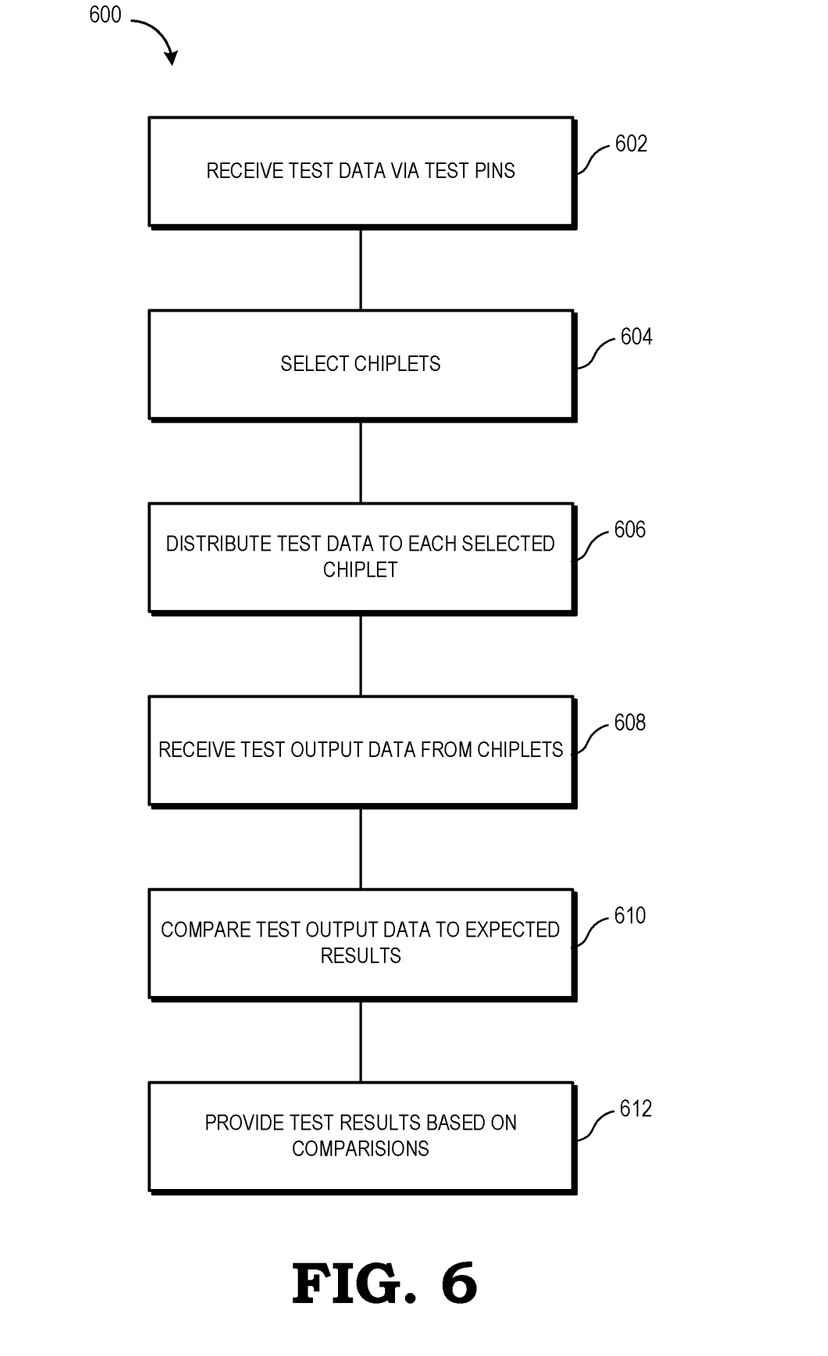
FIG. 6 is a flow diagram illustrating a method for distributing test data at a processor having multiple functional dies in accordance with some embodiments.

FIG. 6 illustrates a flow diagram of a method 600 of distributing test data at a multi-chip integrated circuit in accordance with some embodiments. For purposes of description, the method 600 is described with respect to an example implementation at the processor 102 of FIG. 2, but it will be appreciated that in other embodiments the method 600 is implemented at different multi-chip integrated circuits.

At block 602, the TDM 105 receives the test input data 220 via the IC pins 112. In response, at block 604, the TDM 105 selects the ones of the chiplets 104-110 that are to be tested. In some embodiments, the TDM 105 selects the chiplets based on control information provided via the IC pins 112. At block 606, the TDM 105 concurrently distributes the test input data 220 to each of the selected chiplets.

In response to receiving the test input data 220, each of the selected chiplets generates corresponding test output data. At block 608, the TDM 105 receives the test output data from each of the selected chiplets. At block 610, the TDM 105 compares the received test output data to the expected test results 326. Based on the comparison, at block 612 the TDM 105 generates the chiplet test results 325 and provides the chiplet test results to the test controller 115 via the IC pins 112.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An integrated circuit comprising:
a plurality of semiconductor dies comprising multiple die types of semiconductor dies;
a set of pins configured to receive test input data from a device external to the integrated circuit; and
a test distribution circuitry configured to concurrently distribute the received test input data to a first subset of the plurality of semiconductor dies belonging to a first die type of the multiple die types of semiconductor dies based on received control information.

2. The integrated circuit of claim 1, wherein:
the test distribution circuitry is configured to receive test output data from each semiconductor die of the first subset of the plurality of semiconductor dies and provide chip test results based on the received test output data.

3. The integrated circuit of claim 1, wherein:
the plurality of semiconductor dies comprises a second subset of semiconductor dies belonging to a second die type of the multiple die types, wherein the second die type is different from the first die type, and
wherein the test distribution circuitry does not distribute the received test input data to the second subset of semiconductor dies.

4. The integrated circuit of claim 2 wherein:
the test distribution circuitry is to determine the chip test results based on a comparison of the test output data to a set of expected test results.

5. The integrated circuit of claim 4, wherein:
the test distribution circuitry is configured to receive the expected test results via the set of pins.

6. The integrated circuit of claim 1, wherein:
the test distribution circuitry is configured to apply a mask to test output data generated by one or more dies in the first subset of the plurality of semiconductor dies.

7. The integrated circuit of claim 6, wherein:
the test distribution circuitry is configured to receive the mask via the set of pins.

8. The integrated circuit of claim 1, wherein:
the test distribution circuitry is configured to select the first subset of the plurality of semiconductor dies to receive the test input data based on the received control information, wherein the test distribution circuitry is to receive the received control information via the set of pins.

9. The integrated circuit of claim 1, wherein:
the first die type comprises one of a central processing unit (CPU), a graphics processing unit (GPU), a neural processing unit (NPU), a digital signal processor (DSP), or a field programmable gate array (FPGA), and another die type of the multiple die types of semiconductor dies comprises a different one of the CPU, the GPU, the NPU, the DSP, or the FPGA than the first die type.

10. The integrated circuit of claim 9, wherein the set of pins is configured to receive second test input data, and wherein the test distribution circuitry is configured to concurrently distribute the received second test input data to a second subset of the plurality of semiconductor dies, the second subset different from the first subset and belonging to a second die type of the multiple die types of semiconductor dies.

11. An integrated circuit comprising:
a plurality of semiconductor dies comprising multiple die types of semiconductor dies;
a set of pins configured to receive test input data from a device external to the integrated circuit; and
a test distribution circuitry configured to select a first subset of the plurality of semiconductor dies belonging to a first die type of the multiple die types of semiconductor dies or a second subset of the plurality of semiconductor dies belonging to a second die type of the multiple die types of semiconductor dies and to concurrently distribute the received test input data to the selected first or second subset of the plurality of semiconductor dies based on received control information.

12. The integrated circuit of claim 11, wherein:
the test distribution circuitry is configured to receive test output results from each semiconductor die of the selected first or second subset of the plurality of semiconductor dies and provide chip test results based on the received test output results via the set of pins.

13. The integrated circuit of claim 11, wherein:
the test distribution circuitry is configured to concurrently distribute the received test input data to the selected first or second subset of the plurality of semiconductor dies to trigger the selected first or second subset of the plurality of semiconductor dies to concurrently generate test output data.

14. The integrated circuit of claim 11, wherein:
the test distribution circuitry is configured to apply a mask to test output data generated by one or more of the plurality of semiconductor dies.

15. The integrated circuit of claim 11, wherein:
the plurality of semiconductor dies communicate with the test distribution circuitry via an interposer.

16. The integrated circuit of claim 15, wherein:
the interposer comprises one or more of a silicon interposer, a silicon bridge, or a silicon substrate.

17. The integrated circuit of claim 11, wherein:
the plurality of semiconductor dies comprise at least one semiconductor die of the first die type and one semiconductor die of the second die type, wherein the at least one semiconductor die of the first die type comprises one of a central processing unit (CPU), a graphics processing unit (GPU), a neural processing unit (NPU), a digital signal processor (DSP), or a field programmable gate array (FPGA), and wherein the at least one semiconductor die of the second die type comprises a different one of the CPU, the GPU, the NPU, the DSP, or the FPGA than the at least one semiconductor die of the first die type.

18. The integrated circuit of claim 17, wherein:
the plurality of semiconductor dies comprise at least one semiconductor die of a third die type.

19. A method, comprising:
receiving, at a set of pins of an integrated circuit comprising a plurality of dies comprising multiple die types, test input data from a device external to the integrated circuit; and
concurrently distributing the test input data to a subset of the plurality of dies of the integrated circuit belonging to a first die type of the multiple die types of based on control information received via the set of pins.

20. The method of claim 19, further comprising:
generating test output data at each of the plurality of dies in the subset based on the test input data; and
generating test results based on a comparison of the test output data with expected test results.

* * * * *